United States Patent
Kwak et al.

(10) Patent No.: US 11,075,535 B2
(45) Date of Patent: Jul. 27, 2021

(54) ELECTRONIC DEVICE AND METHOD OF CONTROLLING CHARGING OF THE SAME

(71) Applicant: Samsung Electronics Co., Ltd., Gyeonggi-do (KR)

(72) Inventors: Woongeun Kwak, Seongnam-si (KR); Jungsik Park, Suwon-si (KR); Junyun Kim, Yongin-si (KR); Dohun Cha, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 383 days.

(21) Appl. No.: 15/849,296

(22) Filed: Dec. 20, 2017

(65) Prior Publication Data
US 2018/0183261 A1  Jun. 28, 2018

(30) Foreign Application Priority Data
Dec. 23, 2016  (KR) .................. 10-2016-0177712

(51) Int. Cl.
*H02J 7/00* (2006.01)
*H01M 10/44* (2006.01)
(Continued)

(52) U.S. Cl.
CPC ....... *H02J 7/007192* (2020.01); *H01M 10/44* (2013.01); *H01M 10/443* (2013.01);
(Continued)

(58) Field of Classification Search
CPC .. H02J 7/007192; H02J 7/0091; H02J 7/0029; H01M 10/60; H01M 10/443;
(Continued)

(56) References Cited

U.S. PATENT DOCUMENTS 4,125,802 A  11/1978  Godard
5,252,906 A * 10/1993  Busson ................. H02J 7/0078
                                                          320/132
(Continued)

FOREIGN PATENT DOCUMENTS

DE  2642243 A1  4/1977
EP  2930586 A1  10/2015
(Continued)

OTHER PUBLICATIONS

Extended European Search Report and European Search Opinion for European Patent Application No. 17209846.9 dated Apr. 6, 2018; 8 pages.
(Continued)

*Primary Examiner* — Zixuan Zhou

(57) ABSTRACT

An electronic device includes a circuit board; a battery; and a charging circuitry for charging the battery. The electronic device also includes a first sensor positioned in a first area of the battery or in an area in proximity of the first area in the circuit board for measuring a first temperature corresponding to the first area and a second sensor positioned in a second area of the battery or in an area in proximity of the second area in the circuit board for measuring a second temperature corresponding to the second area. The electronic device also includes a processor, wherein the processor is configured to acquire the first temperature via the first sensor and the second temperature via the second sensor. The processor is also configured to charge the battery with a specified current when a difference between the first and the second temperature satisfies a designated condition.

20 Claims, 11 Drawing Sheets

(51) Int. Cl.
 *H01M 10/60* (2014.01)
 *H01M 10/48* (2006.01)

(52) U.S. Cl.
 CPC ........... *H01M 10/60* (2015.04); *H02J 7/0091* (2013.01); *H01M 10/486* (2013.01); *H02J 7/0029* (2013.01); *Y02B 40/00* (2013.01)

(58) Field of Classification Search
 CPC .............. H01M 10/44; H01M 10/486; H01M 2220/30; H01M 10/425
 USPC ........................................................ 320/150
 See application file for complete search history.

(56) References Cited

U.S. PATENT DOCUMENTS

| | | | | |
|---|---|---|---|---|
| 5,391,974 | A | * | 2/1995 | Shiojima .............. H02J 7/0091 320/150 |
| 5,652,500 | A | * | 7/1997 | Kadouchi ............. H01M 10/66 320/150 |
| 2002/0101218 | A1 | * | 8/2002 | Koenck ................. H02J 7/0071 320/140 |
| 2014/0140369 | A1 | | 5/2014 | Erhart |
| 2015/0035495 | A1 | | 2/2015 | Yoshida |
| 2015/0153416 | A1 | | 6/2015 | Umemura et al. |
| 2015/0229155 | A1 | | 8/2015 | Sporck et al. |
| 2016/0276715 | A1 | | 9/2016 | Kajitani |
| 2016/0338000 | A1 | | 11/2016 | Halla et al. |

FOREIGN PATENT DOCUMENTS

| | | |
|---|---|---|
| JP | 2012216422 A | 11/2012 |
| JP | 2015106981 A | 6/2015 |
| KR | 1020150173426 A | 10/2016 |

OTHER PUBLICATIONS

Communication pursuant to Article 94(3) EPC dated Apr. 6, 2020 in connection with European Patent Application No. 17 209 846.9, 9 pages.

* cited by examiner

ELECTRONIC DEVICE AND METHOD OF CONTROLLING CHARGING OF THE SAME

CROSS-REFERENCE TO RELATED APPLICATION AND CLAIM OF PRIORITY

This application is related to and claims priority to Korean Patent Application No. 10-2016-0177712 filed on Dec. 23, 2016, the contents of which are incorporated herein by reference.

TECHNICAL FIELD

Various exemplary embodiments of the present invention relate to an electronic device that can control charging of a battery based on a temperature.

BACKGROUND

In general, electronic devices such as a smart phone, tablet personal computer (PC), portable multimedia player (PMP), personal digital assistant (PDA), laptop PC, and wearable device such as a wrist watch and a head-mounted display (HMD) include other various functions (e.g., social network service (SNS), Internet surfing, multimedia reproduction, and picture and moving picture photographing and reproduction) as well as a phone function. While such a portable electronic device has various functions, a current consumed by a processor increases. Therefore, various batteries and charge technologies of a high performance are appeared. Further, with increase of a battery charging amount, interest in technology for preventing a temperature of the battery from increasing and the battery from erroneously operating and being damaged increases.

When a battery of the electronic device is charged, a temperature of the battery may increase, a temperature may disproportionately increase for each area of the battery (e.g., the upper end or the low end of the battery). When a temperature of the battery disproportionately increases, the battery may be damaged or incompletely charged because of unbalance in a thickness and a charge energy amount of the battery.

SUMMARY

To address the above-discussed deficiencies, it is a primary object to provide an electronic device and a method of controlling charging of the same that can charge more stably and efficiently a battery by controlling charging of the battery based on a temperature of the battery (e.g., a temperature on an area basis of the battery).

In accordance with an aspect of the present invention, an electronic device includes a circuit board; a battery; charging circuitry for charging the battery; a first sensor positioned in a first area of the battery or in an area in proximity of the first area in the circuit board and for measuring a first temperature corresponding to the first area; a second sensor positioned in a second area of the battery or in an area in proximity of the second area in the circuit board and for measuring a second temperature corresponding to the second area; and a processor. According to various exemplary embodiments, the processor may acquire a first temperature measured using the first sensor and a second temperature measured using the second sensor and charge the battery with a specified current using the charging circuitry when a difference between the first temperature and the second temperature satisfies a designated condition.

In accordance with another aspect of the present invention, an electronic device includes a circuit board; a battery; charging circuitry for charging the battery; at least one sensor positioned in the battery or in an area in proximity of the battery in the circuit board and for measuring a first temperature corresponding to a first area of the battery and a second temperature corresponding to a second area of the battery; and a processor. According to various exemplary embodiments, the processor may acquire a first temperature and a second temperature measured using the at least one sensor and charge the battery with a specified current using the charging circuitry when a difference between the first temperature and the second temperature satisfies a designated condition.

In accordance with another aspect of the present invention, an electronic device includes a circuit board; a battery; charging circuitry for charging the battery; at least one sensor positioned in the battery or in an area in proximity of the battery in the circuit board and for measuring a first temperature corresponding to a first area of the battery and a second temperature corresponding to a second area of the battery; and a processor. According to various exemplary embodiments, the processor may acquire a first temperature and a second temperature measured using the at least one sensor and control a function of the charging circuitry related to charging of the battery when a difference between the first temperature and the second temperature satisfies a designated condition.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
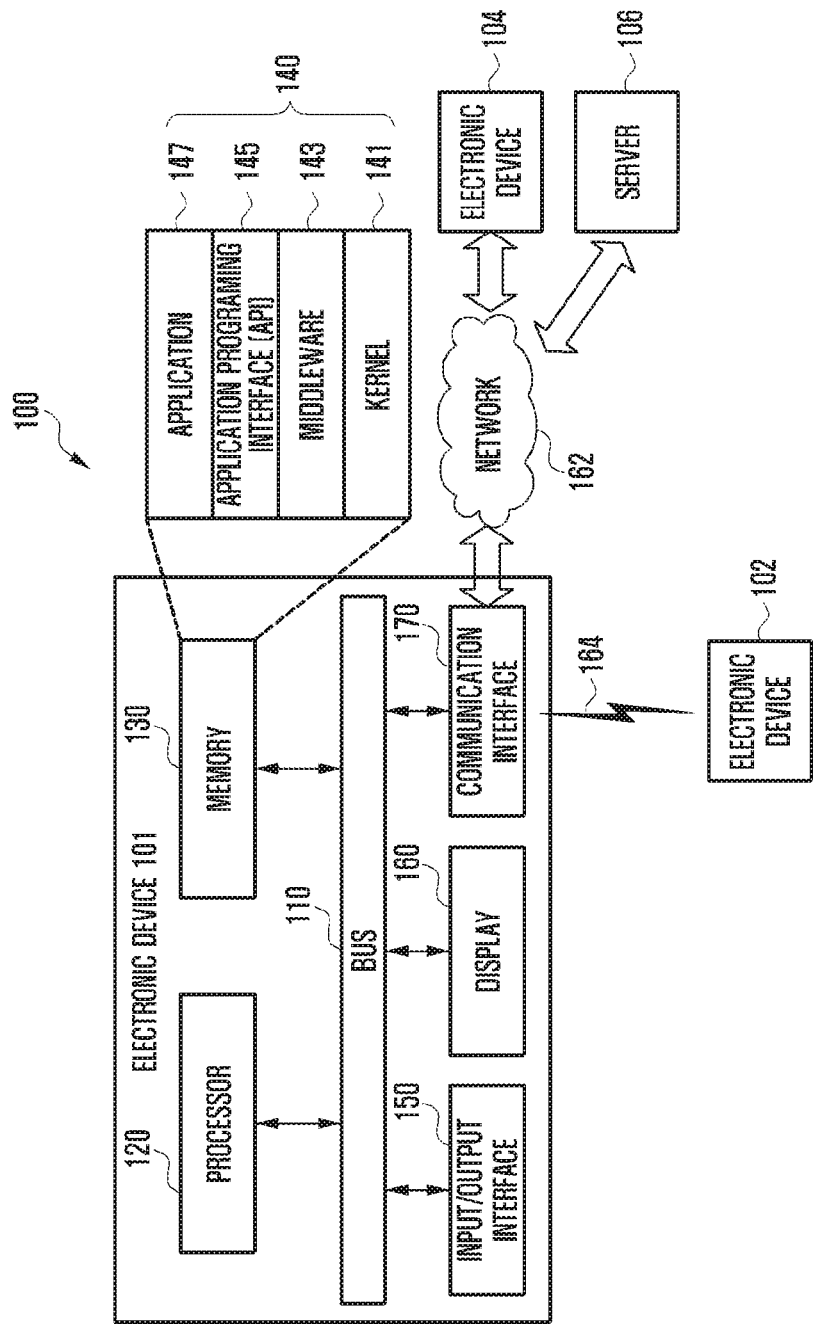
FIG. 1 illustrates a block diagram of a configuration of an electronic device in a network environment, according to various embodiments of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate exemplary embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be analyzed that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic accessory, or a smart watch).

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., SAMSUNG HOMESYNC, APPLY TV, GOOGLE TV, etc.), a game console, an electronic dictionary, an electronic key, a camcorder, or an electronic picture frame.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are exemplary only and not to be considered as a limitation of this disclosure.

FIG. 1 illustrates a block diagram of a configuration of an electronic device in a network environment, according to various embodiments of the present disclosure. FIG. 1 is a block diagram 100 illustrating an electronic apparatus according to an embodiment of the present disclosure.

Referring to FIG. 1, the electronic device 101 may include a bus 110, a processor 120, a memory 130, a user input module 150, a display 160, and a communication interface 170.

The bus 110 may be a circuit for interconnecting elements described above and for allowing a communication, e.g. by transferring a control message, between the elements described above.

The processor 120 can receive commands from the above-mentioned other elements, e.g. the memory 130, the user input module 150, the display 160, and the communication interface 170, through, for example, the bus 110, can decipher the received commands, and perform operations and/or data processing according to the deciphered commands.

The memory 130 can store commands received from the processor 120 and/or other elements, e.g. the user input module 150, the display 160, and the communication interface 170, and/or commands and/or data generated by the processor 120 and/or other elements. The memory 130 may include software and/or programs 140, such as a kernel 141, middleware 143, an Application Programming Interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic device 101.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic device 101 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The user input module 150 can receive, for example, a command and/or data from a user, and transfer the received command and/or data to the processor 120 and/or the memory 130 through the bus 110. The display 160 can display an image, a video, and/or data to a user.

The communication interface 170 can establish a communication between the electronic device 101 and another electronic devices 102 and 104 and/or a server 106. The communication interface 170 can support short range communication protocols, e.g. a Wireless Fidelity (WI-FI) protocol, a BLUETOOTH (BT) protocol, and a Near Field Communication (NFC) protocol, communication networks, e.g. Internet, Local Area Network (LAN), Wire Area Network (WAN), a telecommunication network, a cellular network, and a satellite network, or a Plain Old Telephone Service (POTS), or any other similar and/or suitable communication networks, such as network 162, or the like. Each of the electronic devices 102 and 104 may be a same type and/or different types of electronic apparatus.

Figure 2:
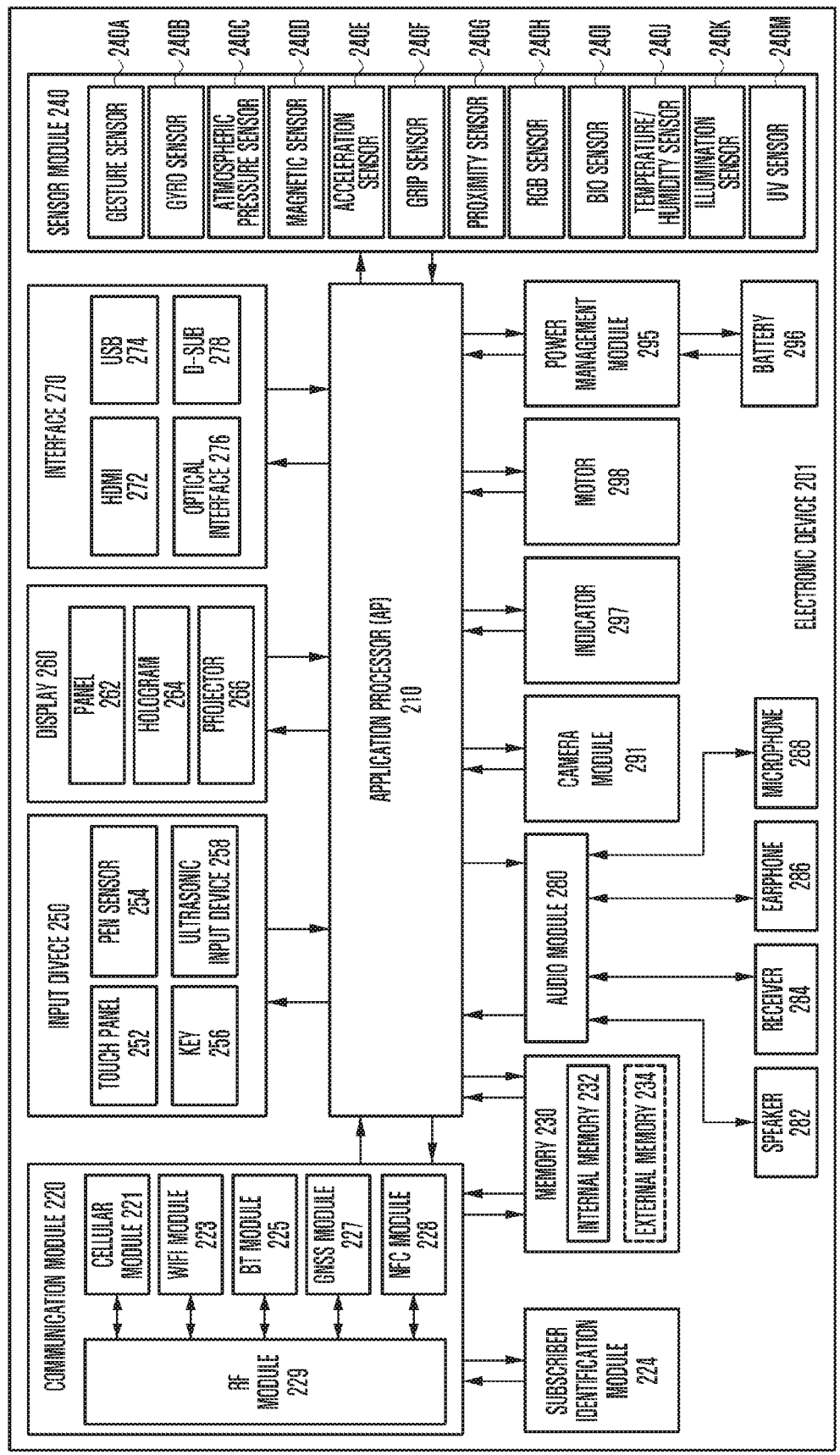
FIG. 2 illustrates a block diagram of a configuration of an electronic device, according to various embodiments of the present disclosure.

FIG. 2 illustrates a block diagram of an electronic device 201, according to various embodiments of the present disclosure. The electronic device 201 may form, for example, the whole or part of the electronic device 201 shown in FIG. 1. Referring to FIG. 2, the electronic device 201 may include at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 170) may perform a data communication with any other electronic device (e.g., the electronic device 104 or the server 106) connected to the electronic device 201 (e.g., the electronic device 101) through the network. According to an embodiment, the communication module 220 may include therein a cellular module 221, a WiFi module 223, a BT module 225, a GPS module 227, an NFC module 228, and an RF (Radio Frequency) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory for processing. Additionally, the AP 210 or the cellular module 221 may store data, received from or created at one or more of the other elements, in the nonvolatile memory.

Each of the WiFi module 223, the BT module 225, the GPS module 227, and the NFC module 228 may include a processor for processing data transmitted or received through the corresponding module. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WI-FI processor corresponding to the WiFi module 223) of respective processors corresponding to the cellular module 221, the WiFi module 223, the BT module 225, the GPS module 227 and the NFC module 228 may be formed as a single SoC.

Figure 3:
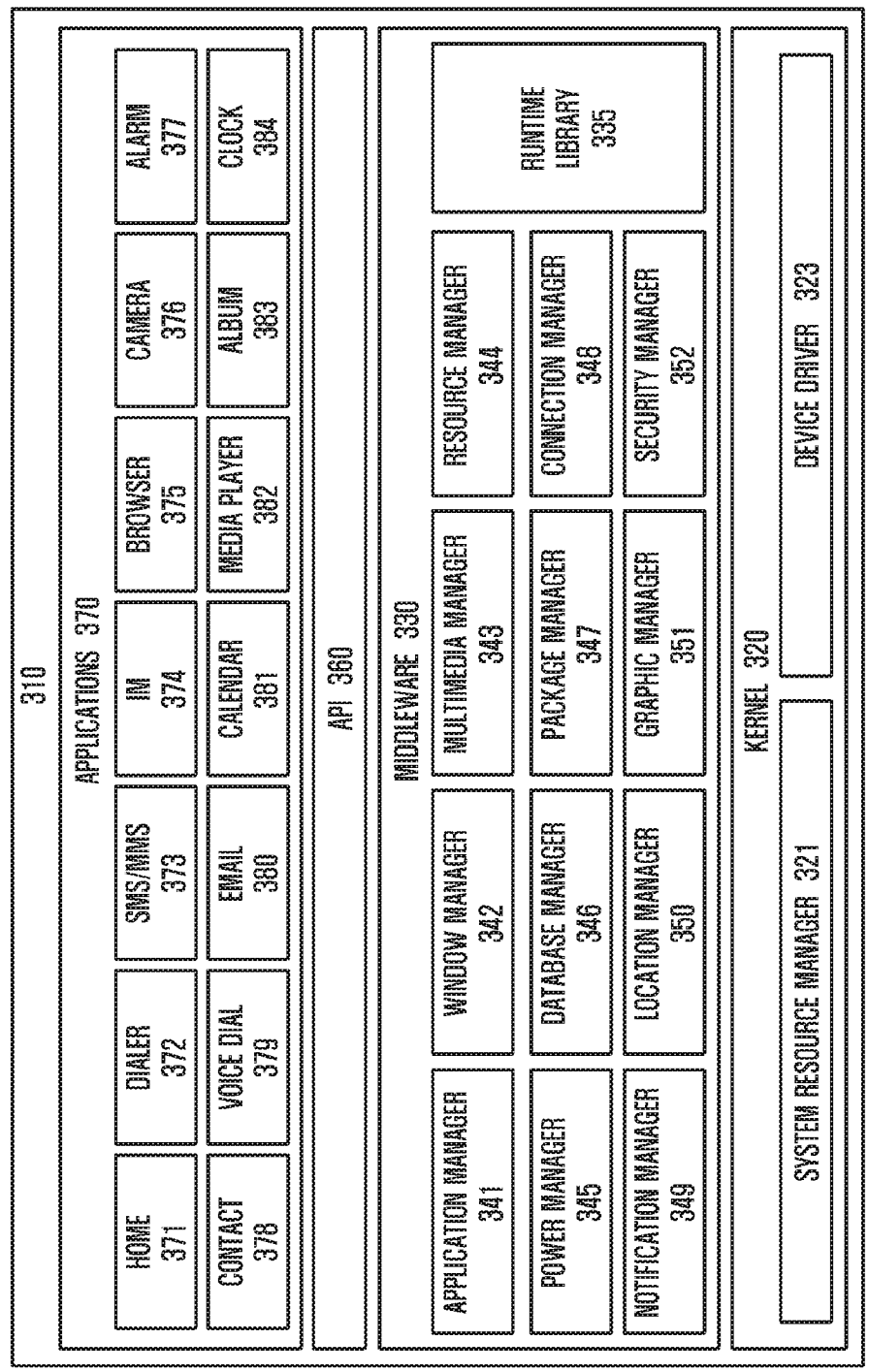
FIG. 3 illustrates a block diagram of a configuration of a program module, according to various embodiments of the present disclosure.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 3 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224 may be a specific card formed of SIM and may be inserted into a slot formed at a certain place of the electronic device 201. The SIM card 224 may contain therein an ICCID (Integrated Circuit Card IDentifier) or an IMSI (International Mobile Subscriber Identity).

The memory 230 (e.g., the memory 130) may include an internal memory 232 and an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 234 may be functionally connected to the electronic device 201 through various interfaces. According to an embodiment, the electronic device 201 may further include a storage device or medium such as a hard drive.

The sensor module 240 may measure physical quantity or sense an operating status of the electronic device 201, and then convert measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input device 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 201 through an input tool that generates ultrasonic signals, thus allowing wireless recognition. According to an embodiment, the electronic device 201 may receive a user input from any external device (e.g., a computer or a server) connected thereto through the communication module 220.

The display 260 (similar to the display 160 of FIG. 1) may include a panel 262, a hologram 264, or a projector 266. The panel 262 may be, for example, LCD (Liquid Crystal Display), AM-OLED (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment, the display 260 may further include a control circuit for controlling the panel 262, the hologram 264, and the projector 266.

The interface 270 may include, for example, an HDMI (High-Definition Multimedia Interface) 272, a USB (Universal Serial Bus) 274, an optical interface 276, or a D-sub (D-subminiature) 278. The interface 270 may be contained, for example, in the communication interface 170 shown in FIG. 1. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage electric power of the electronic device 201. Although not shown, the power management module 295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 301 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

FIG. 3 illustrates a block diagram of a configuration of a programming module 310 according to various embodiments of the present disclosure.

The programming module 310 may be included (or stored) in the electronic device 301 (e.g., the memory 130 illustrated in FIG. 1) or may be included (or stored) in the electronic device 201 (e.g., the memory 230) illustrated in FIG. 2. At least a part of the programming module 310 may be implemented in software, firmware, hardware, or a combination of two or more thereof. The programming module 310 may be implemented in hardware, and may include an OS controlling resources related to an electronic device (e.g., the electronic device 101 or 201) and/or various applications (e.g., an application 370) executed in the OS. For example, the OS may be ANDROID, IOS, WINDOWS, SYMBIAN, TIZEN, BADA, and the like.

Referring to FIG. 3, the programming module 310 may include a kernel 320, a middleware 330, an API 360, and/or the application 370.

The kernel 320 (e.g., the kernel 141 of FIG. 1) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a BLUETOOTH driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 323 may include an Inter-Process Communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, WI-FI and BLUETOOTH. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 145) is a set of API programming functions, and may be provided with a different configuration according to an OS. In the case of ANDROID or IOS, for example, one API set may be provided to each platform. In the case of TIZEN, for example, two or more API sets may be provided to each platform.

The applications 370 (e.g., the applications 147) may include, for example, a preloaded application and/or a third party application. The applications 370 (e.g., the applications 147) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors (e.g., the AP 210), the one or more processors may perform functions corresponding to the instructions. The non-transitory computer-readable storage medium may be, for example, the memory 230. At least a part of the programming module 310 may be implemented (e.g., executed) by, for example, the one or more processors. At least a part of the programming module 310 may include, for example, a module, a program, a routine, a set of instructions, and/or a process for performing one or more functions.

An electronic device according to various exemplary embodiments of the present invention may include a circuit board; a battery; charging circuitry for charging the battery; a first sensor positioned in a first area of the battery or in an area in proximity of the first area in the circuit board and for measuring a first temperature corresponding to the first area; a second sensor positioned in a second area of the battery or in an area in proximity of the second area in the circuit board and for measuring a second temperature corresponding to the second area; and a processor.

According to various exemplary embodiments, the processor may acquire a first temperature measured using the first sensor and a second temperature measured using the second sensor and charge the battery with a specified current using the charging circuitry when a difference between the first temperature and the second temperature satisfies a designated condition.

According to various exemplary embodiments, the sensor may be disposed at various positions such as a surface of a battery, a circuit board adjacent to the battery, and an area adjacent to the battery. According to an exemplary embodiment, the electronic device may measure a temperature of the battery using a reaction of a pixel of a portion corresponding to a position of the battery in a display. For example, the electronic device may measure a parameter of pixels of a portion corresponding to a position of the battery in the display and determine a temperature of the battery of a corresponding area using the measured parameter.

According to various exemplary embodiments, the processor may perform the acquired operation while the battery is charged with another specified current.

According to various exemplary embodiments, the processor may change the another specified current to the specified current with at least a portion of the charging operation.

According to various exemplary embodiments, when a difference between the first temperature and the second temperature does not satisfy a designated condition, the processor may refrain from changing the another specified current to the specified current.

According to various exemplary embodiments, the electronic device may further include a third sensor for measuring a third temperature corresponding to at least one element connected to the circuit board.

According to various exemplary embodiments, the processor may acquire the third temperature measured using the third sensor and perform the charging operation when the third temperature satisfies a designated condition.

An electronic device according to various exemplary embodiments of the present invention includes a circuit board; a battery; charging circuitry for charging the battery; at least one sensor positioned in the battery or in an area in proximity of the battery in the circuit board and for measuring a first temperature corresponding to a first area of the battery and a second temperature corresponding to a second area of the battery; and a processor.

According to various exemplary embodiments, the processor may acquire a first temperature and a second temperature measured using the at least one sensor and charge the battery with a specified current using the charging circuitry when a difference between the first temperature and the second temperature satisfies a designated condition.

According to various exemplary embodiments, the processor may perform the acquired operation while the battery is charged with another specified current.

According to various exemplary embodiments, the processor may change the another specified current to the specified current with at least a portion of the charging operation.

According to various exemplary embodiments, when a difference between the first temperature and the second temperature is within a designated range, the processor may determine that the difference satisfies the designated condition.

According to various exemplary embodiments, the electronic device may further include a third sensor for measuring a third temperature corresponding to at least one element connected to the circuit board. For example, the electronic device may further include a third sensor for measuring a temperature of the processor (e.g., AP).

According to various exemplary embodiments, the processor may acquire the third temperature measured using the third sensor and perform the charging operation when the third temperature satisfies a designated condition.

An electronic device according to various exemplary embodiments of the present invention includes a circuit board; a battery; charging circuitry for charging the battery; at least one sensor positioned in the battery or in an area in proximity of the battery in the circuit board and for measuring a first temperature corresponding to a first area of the battery and a second temperature corresponding to a second area of the battery; and a processor.

According to various exemplary embodiments, the processor may acquire a first temperature and a second temperature measured using the at least one sensor and control a function of the charging circuitry related to charging of the battery when a difference between the first temperature and the second temperature satisfies a designated condition.

According to various exemplary embodiments, the processor may perform the acquired operation while the battery is charged with a first specified current.

According to various exemplary embodiments, the processor may change a current for using for charging of the battery from the first specified current to a second specified current with at least a portion of the control operation.

According to various exemplary embodiments, the processor may stop at least temporarily charging of the battery with at least a portion of the control operation.

According to various exemplary embodiments, the processor may resume charging of the battery after a designated time is terminated.

According to various exemplary embodiments, the processor may perform the resuming operation when the difference satisfies another designated condition after the designated time is terminated.

According to various exemplary embodiments, the processor may perform the acquiring operation while the battery is not charged and start charging of the battery with at least a portion of the control operation. For example, the processor may measure a temperature of the battery before charging of the battery, and when a temperature (e.g., a first temperature) of a first area of the battery or a temperature difference (e.g., a difference between the first temperature and a second temperature of a second area of the battery) according to an area of the battery satisfies a designated condition, the processor may start charging of the battery. For another example, while charging the battery, when a temperature (e.g., first temperature) of a first area of the battery or a temperature difference (e.g., a difference between the first temperature and a second temperature of a second area of the battery) according to an area of the battery satisfies a designated condition, the processor may stop at least temporarily charging of the battery.

According to various exemplary embodiments, the at least one sensor may include a first sensor for measuring the first temperature and a second sensor for measuring the second temperature.

According to various exemplary embodiments, the first sensor may be disposed in the first area, and the second sensor may be disposed in the second area.

According to various exemplary embodiments, the first area may be a partial area of the upper end of the battery, and the second area may be a partial area of the low end of a direction opposite to that of the first area of the battery.

According to various exemplary embodiments, when the first temperature or the second temperature is equal to or larger than a designated temperature, the processor may determine the difference between the first temperature and the second temperature.

According to various exemplary embodiments, the electronic device (e.g., a processor) may control charging of a battery according to a parameter (e.g., a thickness, pressure, or voltage of the battery) other than a temperature. For example, the battery may have a large thickness according to charging of the battery. For example, a battery thickness may increase according to a charge amount. According to an exemplary embodiment, the electronic device may include sensors that measure a thickness of the battery and control charging of the battery based on a thickness (e.g., a difference between thicknesses on an area basis) on an area basis of the battery. According to an exemplary embodiment, the electronic device may include sensors that measure a pressure applied to the battery and control charging of the battery based on a pressure (e.g., a difference between pressures on an area basis) on an area basis of the battery. According to an exemplary embodiment, the electronic device may measure a voltage on an area basis of the battery and control charging of the battery based on a voltage difference on an area basis.

According to various exemplary embodiments, the processor may include an auxiliary processor (e.g., low power processor or sensor hub) for controlling an operation of a main processor (e.g., AP) or a sensor or charging of a battery. According to various exemplary embodiments, the main processor or the auxiliary processor may individually perform operations of controlling charging of the battery or the main processor or the auxiliary processor may perform to interconnect operations of controlling charging of the battery. For example, the auxiliary processor may perform an operation of measuring a temperature of sensors and determining a difference between temperatures, and the main processor may acquire a difference value between temperatures and control charging of the battery. According to various exemplary embodiments, the present invention is not limited thereto and the operations may be individually performed or may be performed to interconnect by at least one processor with various methods.

Figure 4A:
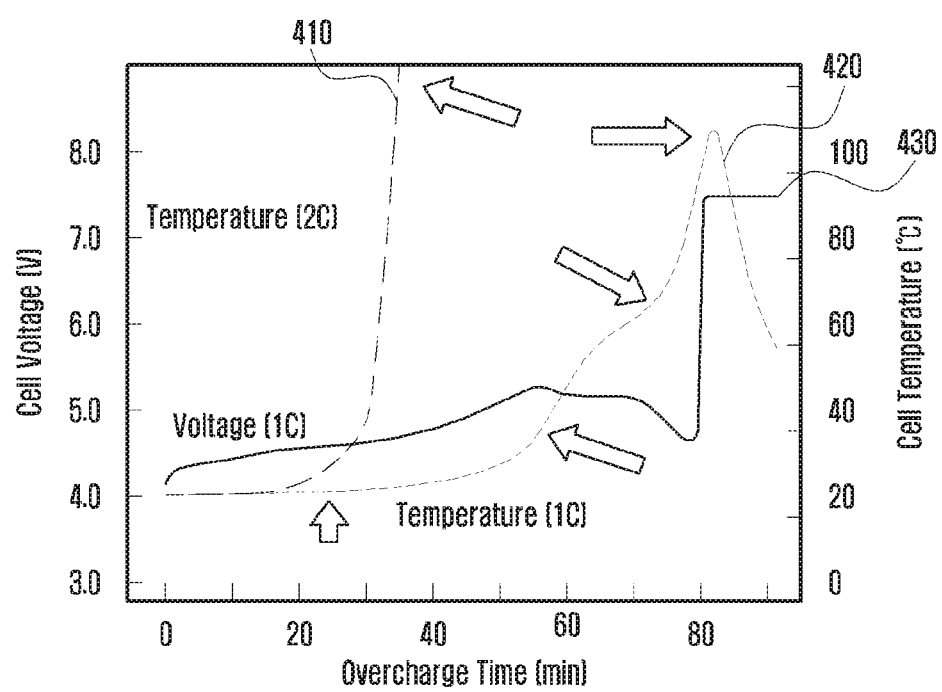
FIG. 4A illustrates a graph of an example of a temperature change of a battery cell according to a charging current, according to various embodiments of the present disclosure.

FIG. 4A illustrates a graph of an example of a temperature change of a battery cell according to a charging current, according to various embodiments of the present disclosure.

According to various exemplary embodiments, when a battery of the electronic device (e.g., the electronic device 101) is charged, a temperature of the battery may increase. For example, when the battery of the electronic device is overcharged, a temperature of the battery may sequentially rapidly increase. For example, when a charging current is 1C (Charging/Discharging Rate), a temperature 420 of the battery may rapidly increase after a predetermined time, and a voltage 430 may also rapidly increase while exceeding a buffer voltage according to temperature increase.

Further, when a current of a higher value is used as a charging current of the battery, a temperature of the battery may more rapidly increase. For example, a temperature 410 of the battery when a charging current is 2C may more rapidly increase within a time smaller than that at a temperature 420 of the battery when a charging current is 1C.

When a temperature of the battery rapidly increases, the battery may be damaged, and other constituent elements within the electronic device may be damaged or the electronic device may erroneously operate because of heating. Therefore, various exemplary embodiments of the present invention provide an electronic device and a method of controlling charging of the same that can control charging of the battery while appropriately maintaining a temperature of the battery.

Figure 4B:
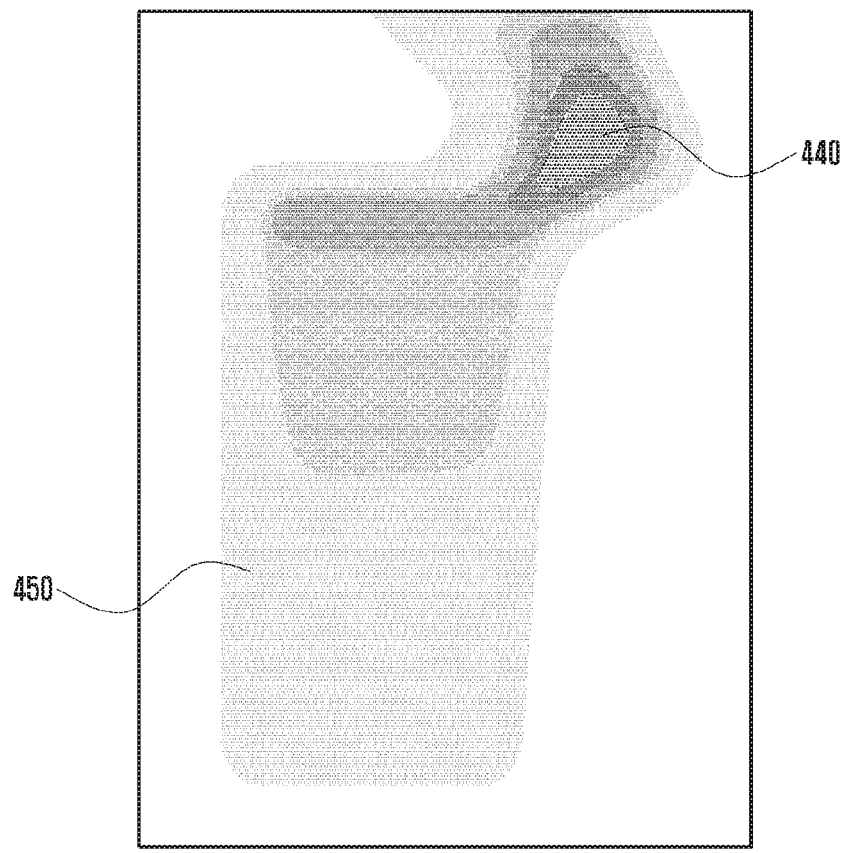
FIG. 4B illustrates a diagram of an example of a temperature change of a battery upon charging the battery, according to various embodiments of the present disclosure.

FIG. 4B illustrates a diagram of an example of a temperature change of a battery upon charging the battery, according to various embodiments of the present disclosure.

FIG. 4B illustrates an example of measuring a temperature of the battery upon charging the battery using a heat sensor (e.g., an infrared camera). For example, while the battery is charged, a temperature may be differently changed according to a battery area. For example, a temperature of an upper end area 440 of the battery may be higher than that of a lower end area 450 thereof.

For example, when unbalance occurs in a temperature on an area basis of the battery, a thickness difference, pressure difference, or voltage difference (e.g., a voltage difference by a difference in a charge amount) on an area basis of the battery may occur according to a temperature. For example, when a temperature on an area basis of the battery is different, a charging amount of a portion having a high temperature is relatively large; thus, unbalance may occur in a charging energy amount within a battery cell. Further, because an electrolyte first dries in an area having a high temperature, ions are relatively quickly deposited and dendrite occurs; thus, battery consumption or damage may be different on an area basis in which a temperature difference has occurred.

Therefore, in order to prevent the battery from being damaged and to efficiently charge the battery, it is necessary to control charging of the battery in consideration of a temperature difference on an area basis of the battery. Hereinafter, an electronic device and a method of controlling charging of the same that effectively control charging of the battery according to a temperature according to various exemplary embodiments of the present invention are provided.

Figure 5:
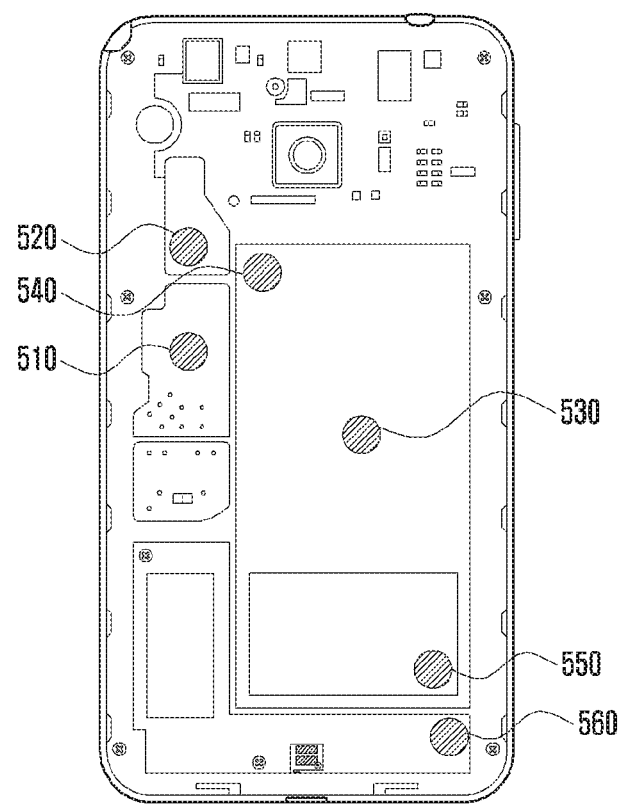
FIG. 5 illustrates a diagram of a structure of an electronic device, according to various embodiments of the present disclosure.

FIG. 5 illustrates a diagram of a structure of an electronic device according to various embodiments of the present disclosure.

The electronic device (e.g., the electronic device 101) according to various exemplary embodiments of the present invention may include a circuit board (e.g., flexible printed circuit board (FPCB)), battery, charging circuitry, and sensors for measuring a temperature. According to an exemplary embodiment, the battery may be mounted within the electronic device to be electrically connected to the circuit board and charging circuitry. According to various exemplary embodiments, the circuit board may be connected to constituent elements within the electronic device. According to an exemplary embodiment, the charging circuitry may include a power management integrated circuit (PMIC).

According to an exemplary embodiment, the electronic device may measure a temperature of the battery using a plurality of sensors. For example, the electronic device may measure a temperature of at least one area of a periphery of the battery. For example, the electronic device may measure a temperature of an area 510 in which a processor of the circuit board is disposed to determine (e.g., estimate or calculate) a temperature of the battery. For example, the electronic device may measure a temperature of a charging circuitry (e.g., PMIC) area to determine a temperature of the battery. For example, the electronic device may measure a temperature of a battery central area 530, a temperature of a left upper end area 540 of the battery, or a temperature of a right low end area 550 of the battery and determine a temperature of the battery based on the temperatures. According to an exemplary embodiment, the electronic device may measure a temperature of a sub-circuit board area 560 (e.g., an outer edge area of the electronic device in which the antenna is mounted) of the low end of the battery to determine a temperature of the battery. According to an exemplary embodiment, the electronic device may determine a temperature of the battery based on at least one of temperatures of areas 510, 520, 530, 540, 550, and 560 in the vicinity of the battery or an average value of a plurality of temperatures of areas 510, 520, 530, 540, 550, and 560 in the vicinity of the battery.

According to an exemplary embodiment, by comprehensively considering a temperature of areas (e.g., 510 to 560) in the vicinity of the battery, the electronic device may determine a temperature of the battery. For example, the electronic device may calculate a designated coefficient (e.g., a value of about 0.5-about 1.0) based on a size (e.g., a length, width, or thickness) of the battery or a distance between at least one temperature sensor (e.g., a temperature sensor of the area 510 in which the processor is disposed and the sub-circuit board area 560) and the battery and determine a temperature of the battery based on the designated coefficient. For example, when a designated coefficient of the electronic device is about 0.9, even if a temperature average value of areas (e.g., 510 to 560) in the vicinity of the battery is about 50°, the electronic device may determine a temperature of the battery to about 45° based on the coefficient. According to various exemplary embodiments, the electronic device may select at least one of a plurality of designated coefficients according to a charge situation (e.g., charge, discharge, wireless charge, or wire charge) to determine a temperature of the battery.

According to various exemplary embodiments, a sensor for measuring a temperature may be disposed at a battery and a circuit board or a peripheral portion adjacent to the battery. According to various exemplary embodiments, when a sensor (e.g., thermistor) that measures a temperature of the battery is disposed at a periphery of a circuit board that encloses a portion of the battery, a sensor may be disposed at a proximity portion deviated from the battery instead of the upper end of the battery. For example, the sensor may be disposed at a side surface portion (or a curved portion) of the battery instead of the upper end of the battery. For example, when the sensor is disposed at the upper end of the battery, a pressure is applied to the battery and the battery may be thus damaged. According to various exemplary embodiments of the present invention, in order to prevent the battery from being damaged, sensors may be disposed in a periphery area of the battery that does not directly contact the battery.

According to various exemplary embodiments of the present invention, the electronic device may control charging of the battery according to a temperature of the battery (e.g., a value calculated based on at least one temperature in areas 510 to 560 or a temperature of areas 510 to 560). According to an exemplary embodiment, the electronic device may control a charging current or a charging voltage of the battery according to a temperature of the battery (e.g., a temperature of at least one of areas 510 to 560). For example, the electronic device may differently set or designate a charging current value and a charging voltage value used for charging the battery on a temperature segment basis.

According to an exemplary embodiment, when a temperature of the battery becomes a lower limit value or less or an upper limit value or more to be a reference, the electronic device may at least temporarily stop charging of the battery.

According to an exemplary embodiment, when a temperature of the battery is less than a designated temperature, the electronic device may increase a charging current according to temperature increase, and when a temperature of the battery is a designated temperature or more, in order to prevent the battery from being damaged, the electronic device may reduce a charging current.

According to an exemplary embodiment, when a temperature of the battery is a designated temperature or more, the electronic device may determine a temperature difference on at least two areas basis of the battery. For example, as a temperature of the battery increases, temperature unbalance of the upper end or the low end of the battery may get worse. For example, a temperature difference may occur while charging a battery upper end area (e.g., an area 510, 520, or 530) of a vicinity in which heating elements such as a circuit board, charging circuitry, and a processor are dense and a battery lower end area (e.g., the area 510, 520, or 530), in which much heat does not occur, such as an antenna. When temperature unbalance on an area basis of the battery gets worse, a thickness on an area basis of the battery becomes different, and unbalance may occur in a charge energy amount of the battery. Further, as battery charge is activated in only a partial area, the partial area of the battery may be first consumed and battery damage may occur. For example, as a temperature of the battery increases, unbalance on an area basis of the battery may get worse. According to an exemplary embodiment, the electronic device may control charging of the battery according to a difference between a first temperature corresponding to a first area (e.g., a partial area of the upper end of the battery such as the area 510, 520, or 530) and a second temperature corresponding to a second area (e.g., a partial area of the low end of the battery such as the area 510, 520, or 530). According to an exemplary embodiment, when a difference between the first temperature and the second temperature satisfies a designated condition, the electronic device may change a charging current or a charging voltage used for charging the battery. For example, when a difference between the first temperature and the second temperature is a designated value or more, the electronic device may charge the battery with a specified current. According to an exemplary embodiment, a specified current may be lower than a charging current when a difference between the first temperature and the second temperature is less than a designated value.

According to an exemplary embodiment, when a difference between a first temperature corresponding to a first area and a second temperature corresponding to a second area satisfies a designated condition (e.g., when a difference between the first temperature and the second temperature is a designated value or more), the electronic device may stop at least temporarily charging of the battery for a designated time. According to an exemplary embodiment, after stopping charging of the battery for a designated time, the electronic device may resume charging of the battery. According to an exemplary embodiment, after a designated time is terminated, when a difference between the first temperature and the second temperature satisfies another designated condition, the electronic device may resume charging of the battery. For example, after a designated time is terminated, when a difference between the first temperature and the second temperature is within another designated range, the electronic device may resume charging of the battery.

According to an exemplary embodiment, even after a designated time is terminated, when a difference between the first temperature and the second temperature is not within the another designated range, the electronic device may not resume charging of the battery but again determine the first temperature and the second temperature after another designated time has elapsed. According to an exemplary embodiment, until the first temperature and the second temperature are within another designated range, the electronic device may repeat an operation of determining the temperature.

According to various exemplary embodiments, the electronic device may control charging of the battery by only a difference between a first temperature corresponding to a first area and a second temperature corresponding to a second area or while controlling charging according to a first temperature, when the first temperature and a second temperature satisfy a designated condition, the electronic device may control charging of the battery according to a difference between the first temperature and the second temperature. According to various exemplary embodiments, while controlling charging of the battery based on a third temperature corresponding to a third area (e.g., another area (not shown) of the circuit board) of the battery, when a difference between a first temperature and a second temperature satisfies a designated condition, the electronic device may control charging of the battery according to a difference between the first temperature and the second temperature.

According to various exemplary embodiments, before charging the battery, the electronic device may measure a temperature of the battery, and while charging the battery, the electronic device may measure a temperature of the battery. According to various exemplary embodiments, the electronic device may start charging of the battery or may terminate charging of the battery according to whether a temperature of the battery (or a temperature difference on an area basis of the battery) satisfies a designated condition.

By controlling charging of the battery in consideration of a temperature difference on an area basis of the battery, the electronic device according to an exemplary embodiment of the present invention can reduce a difference between temperatures on an area basis of the battery or a difference between charge amounts and can stabilize the battery.

A structure, disposition, or area of the electronic device of FIG. 5 are an illustration of the present invention and may be changed according to various exemplary embodiments and are not limited to those of FIG. 5.

Figure 6A:
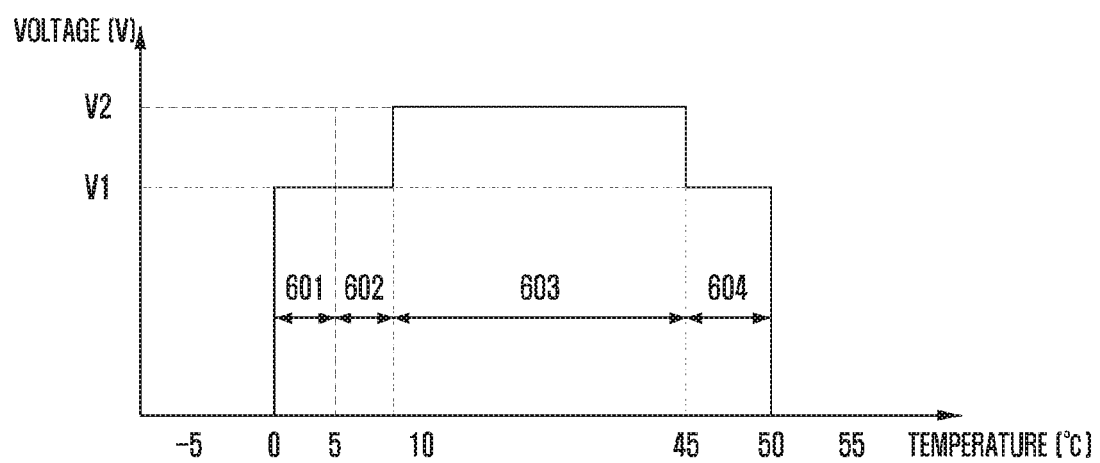
FIGS. 6A and 6B illustrate graphs of a method of controlling charging according to a temperature in an electronic device according to various embodiments of the present disclosure.
Figure 6B:
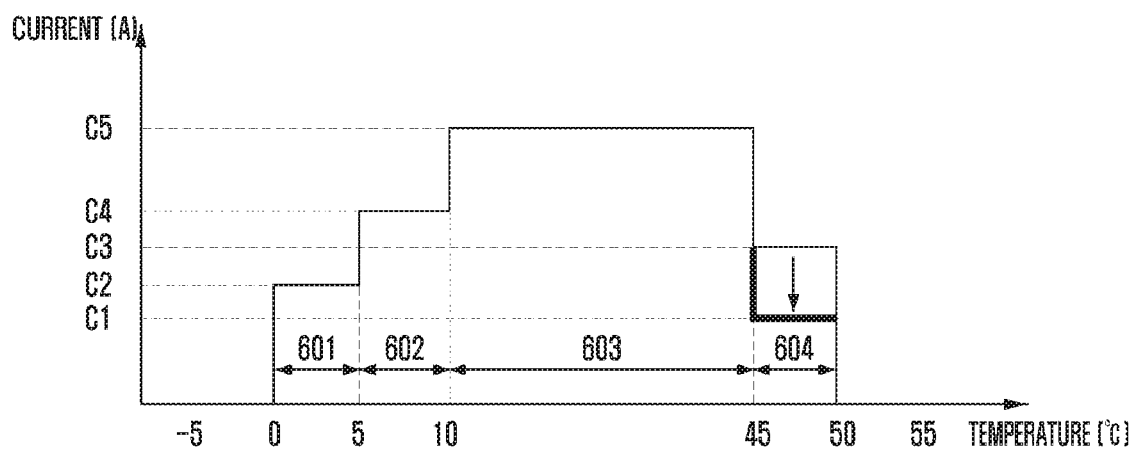

FIGS. 6A and 6B illustrate graphs of a method of controlling charging according to a temperature in an electronic device according to various embodiments of the present disclosure.

FIG. 6A is a graph illustrating a charging voltage of a battery according to a temperature in an electronic device (e.g., the electronic device 101) according to various exemplary embodiments of the present invention. According to various exemplary embodiments of the present invention, the electronic device may control a charging voltage of the battery according to a temperature change of the battery. For example, the electronic device may control a charging voltage of the battery based on a temperature corresponding to one area of the battery. For example, the electronic device may control a charging voltage of the battery based on a temperature (e.g., a temperature average value of a plurality of areas) corresponding to a plurality of areas of the battery. Hereinafter, a temperature of the battery includes a temperature corresponding to a partial area of the battery or an average value of temperatures corresponding to a plurality of areas of the battery and may mean a temperature corresponding to at least one area in the vicinity of the battery of the electronic device according to setup or designation.

For example, the electronic device may maintain a charging voltage of the battery in a designated first voltage V1 at a segment 601 in which a temperature of the battery is between 0° and 5° and at a segment 602 in which a temperature of the battery is between 5° and 10°. For example, the electronic device may maintain a charging voltage of the battery in a designated second voltage V2 at a segment 603 in which a temperature of the battery is between 10° and 45°. According to an exemplary embodiment, when a temperature of the battery is a designated value (e.g., 45°) or more, the electronic device may lower a charging voltage. For example, the electronic device may lower again a charging voltage of the battery to a designated first voltage V1 at a segment 604 in which a temperature of the battery is between 45° to 50°. According to an exemplary embodiment, when a temperature of the battery is a designated value (e.g., 50°) or more, the electronic device may stop charging. For example, when a temperature of the battery exceeds 50°, the electronic device may change a charging voltage to 0. For example, when a temperature of the battery drops to less than a designated value (e.g., 0°), the electronic device may stop charging of the battery.

FIG. 6B is a graph illustrating a charging current of a battery according to a temperature in an electronic device according to various exemplary embodiments of the present invention. According to various exemplary embodiments of the present invention, the electronic device may control a charging current of the battery according to a temperature change of the battery. For example, the electronic device may set a charging current of the battery to a first current C2 at a segment 601 in which a temperature of the battery is between 0° and 5°. For example, upon starting charging of the battery, the electronic device may charge the battery with the first current C2. For example, the electronic device may set a charging current of the battery to a second current C4 higher than the first current C2 at a segment 602 in which a temperature of the battery is between 5° and 10°. For example, the electronic device may set a charging current of the battery to a third current C5 higher than the second current C4 at a segment 603 in which a temperature of the battery is between 10° and 45°. For example, a temperature of the battery may increase according to charging of the battery, and by increasing a charging current of the battery, a charge time of the battery may be shortened. According to an exemplary embodiment, by lowering a charging current at a segment 604 in which a temperature of the battery is between 45° and 50°, the electronic device may charge the battery with a fourth current C3. For example, when a temperature is increased to a designated value (e.g., 45°) or more, in order to prevent the battery from being damaged, the electronic device may again set a charging current of the battery to a low current value (e.g., a fifth current C1).

According to an exemplary embodiment, the electronic device may determine a temperature difference on an area basis of the battery at the segment 604. For example, the electronic device may determine a temperature of a first area (e.g., a partial area of the upper end of the battery) of the battery and a second area (e.g., a partial area of the low end of the battery) of the battery. According to an exemplary embodiment, when a temperature difference on an area basis of the battery satisfies a designated condition, the electronic device may charge the battery with a specified current. For example, when a temperature difference on an area basis of the battery is a designated value (e.g., 5°) or more, the electronic device may charge the battery with the fifth current C1 (e.g., a specified current). For example, while the battery is charged, when a temperature difference on an area basis of the battery is different, unbalance may occur in a charge energy amount on an area basis of the battery and the battery may be damaged. In the electronic device according to various exemplary embodiments of the present invention, when a temperature difference on an area basis of the battery satisfies a designated condition (e.g., when a temperature difference on an area basis of the battery is a designated value or more), by lowering a charging current of the battery, a temperature difference on an area basis of the battery can be reduced and a temperature difference on an area basis and a charge amount on an area basis of the battery can be stabilized.

According to various exemplary embodiments, when a temperature of the battery exceeds a designated value (e.g., 50°) or when a temperature difference on an area basis of the battery is a designated value (e.g., 5°) or more, the electronic device may stop at least temporarily charging of the battery.

Figure 7:
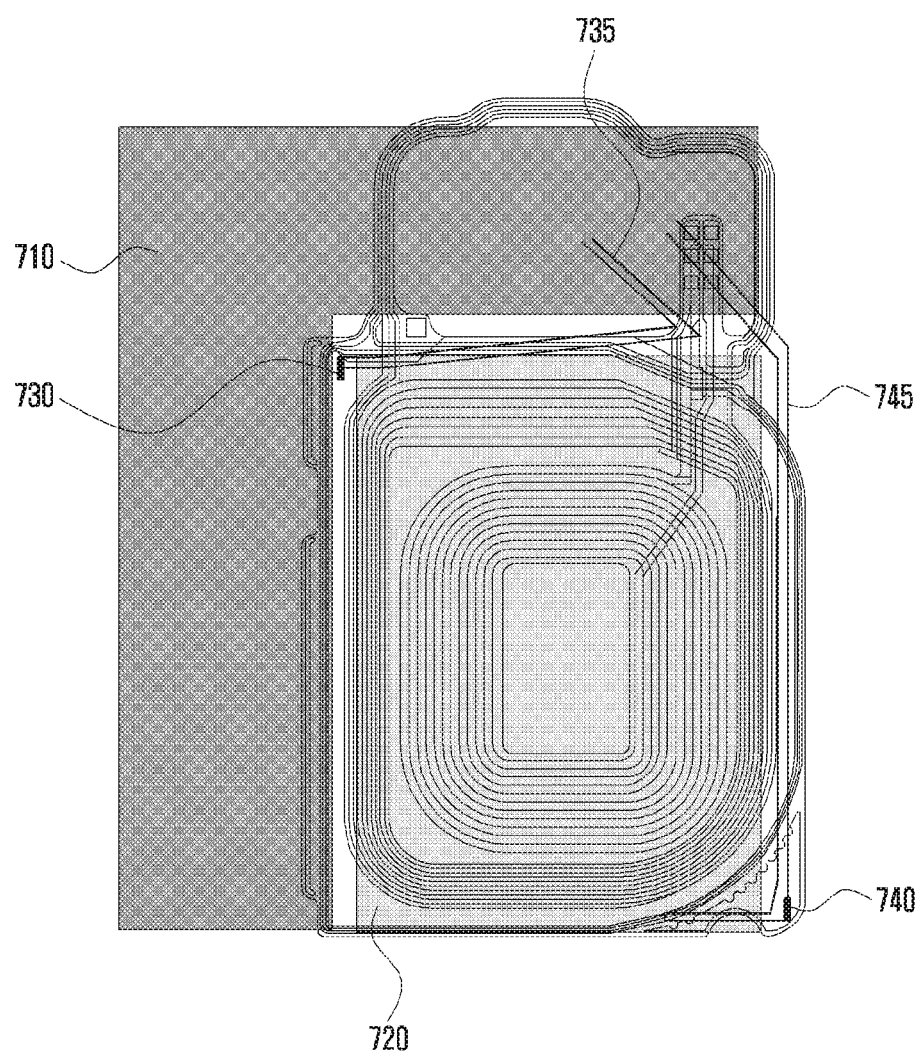
FIG. 7 illustrates a diagram of a structure of an electronic device, according to various embodiments of the present disclosure.

FIG. 7 illustrates a diagram of a structure of an electronic device according to various embodiments of the present disclosure.

According to various exemplary embodiments of the present invention, the electronic device (e.g., the electronic device 101 of FIG. 1) may include a circuit board 710 (e.g., an FPCB or a printed board assembly (PBA)), a battery 720, and a plurality of sensors 730 and 740 for measuring a temperature. According to an exemplary embodiment, in order to measure a temperature, the electronic device may include coil wirings 735 and 745 connected to a plurality of sensors 730 and 740, respectively.

According to an exemplary embodiment, the circuit board 710 may be electrically connected to the battery 720, charging circuitry, and a processor (e.g., the processor 120). For example, the circuit board 710 may be connected to a partial area of the upper end of the battery 720. The circuit board 710 may be electrically connected to the plurality of sensors 730 and 740 and the coil wirings 735 and 745 connected to the plurality of sensors 730 and 740, respectively.

According to an exemplary embodiment, in the battery 720 of the electronic device, a temperature difference may occur on an area basis while charging. The electronic device may include a first sensor 730 that measures a first temperature corresponding to a first area of the battery 720 and a second sensor 740 that measures a second temperature corresponding to a second area of the battery 720. For example, the first area may be a partial area of the upper end of the battery 720, and the second area may be a partial area of the low end of the battery 720. For example, the first area and the second area may be designated to different areas in which a temperature difference may occur. For example, the first area is an area connected to the circuit board 710 at an upper end of the battery 720 and may be an area in which a temperature of the battery 720 highly increases. For example, the second area is a partial area of the low end of the battery 720 in a direction opposite to that of the first area and has no element that increases a temperature at a periphery and may be an area that relatively less increases a temperature of the battery 720. However, according to various exemplary embodiments, an area in which the electronic device measures a temperature is not limited thereto and various positions and areas for measuring a temperature difference of the battery 720 may be designated.

According to an exemplary embodiment, the electronic device may measure a temperature corresponding to a first area and a second area of the battery 720 through a plurality of sensors. For example, the plurality of sensors may include a plurality of thermistors. For example, the electronic device may measure a temperature of the battery 720 through a first coil wiring 735 and a second coil wiring 745 connected to the first sensor 730 (a first thermistor 730) and the second sensor 740 (a second thermistor 740), respectively. For example, in order to accurately measure a temperature of the battery 720, it is necessary that a coil wiring passes through only a partial segment of the battery 720. For example, when the first coil wiring 735 and the second coil wiring 745 pass through other areas other than an area of the battery 720 for measuring a temperature, temperature measurement on an area basis of the battery 720 may not be accurately performed. According to an exemplary embodiment, when the first thermistor 730 is disposed at the upper end of the left side of the battery 720, the first coil wiring 735 connected to the first thermistor 730 may be connected to the circuit board 710 through the upper end of the battery 720. For example, the first coil wiring 735 may minimize a path that passes through an upper portion of the battery 720 through the upper end of the battery 720. According to an exemplary embodiment, when the second thermistor 740 is disposed at the low end of the right side of the battery 720 in a direction opposite to that of the first thermistor 730, the second coil wiring 745 connected to the second thermistor 740 may be wired along a surface that is not in proximity of the circuit board 710 instead of the circuit board side. That is, the second coil wiring 745 may be wired in an external direction of the electronic device to be connected to a circuit board of the upper end.

Figure 8:
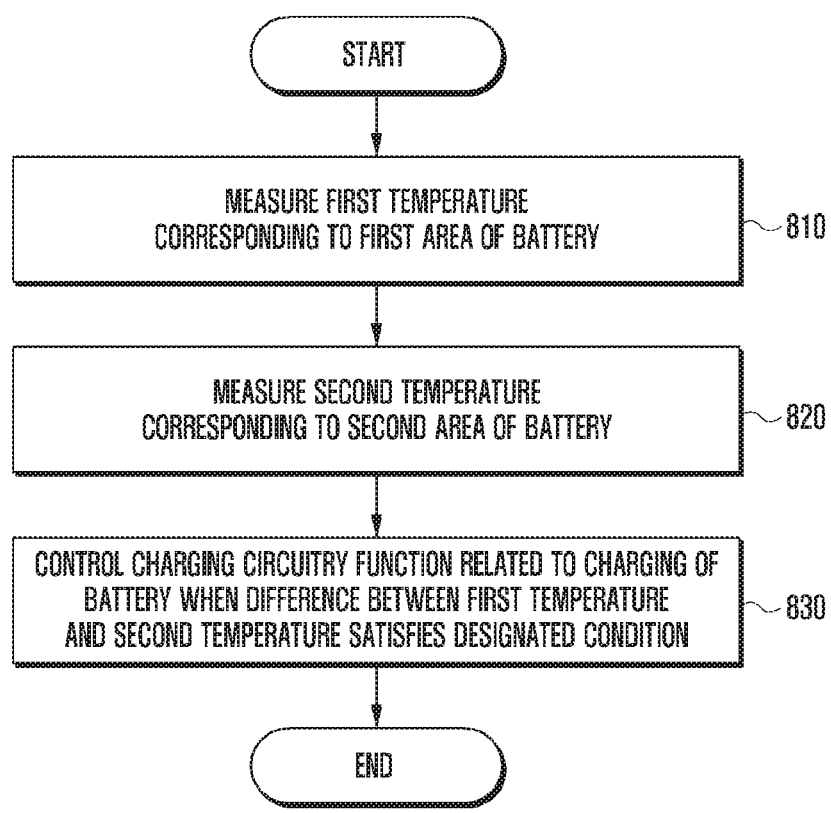
FIG. 8 illustrates a flowchart of a method for controlling the charging of an electronic device, according to various embodiments of the present disclosure.

FIG. 8 illustrates a flowchart of a method for controlling the charging of an electronic device according to various embodiments of the present disclosure.

The electronic device (e.g., the processor 120 or the power management module 295) may measure a first temperature corresponding to a first area of a battery at operation 810. According to an exemplary embodiment, the electronic device may include a first sensor positioned in a first area of the battery or in an area in proximity of a first area in a circuit board and for measuring a temperature corresponding to the first area. The electronic device may measure a temperature corresponding to the first area using the first sensor.

The electronic device (e.g., the processor 120 or the power management module 295) may measure a second temperature corresponding to a second area of the battery at operation 820. According to an exemplary embodiment, the electronic device may include a second sensor positioned in a second area of the battery or in an area in proximity of a second area in a circuit board and for measuring a temperature corresponding to the second area. The electronic device may measure a temperature corresponding to the second area using the second sensor.

According to various exemplary embodiments, the first area and the second area may be set or designated to various areas in a partial area of the battery. For example, the first area may be a partial area of the upper end of the battery, and the second area may be a partial area of the low end of the battery.

According to various exemplary embodiments, while charging the battery, the electronic device may perform operations 810 and 820 to measure a temperature of the first area and the second area or before charging the battery, the electronic device may perform operations 810 and 820 to measure a temperature of the first area and the second area.

When a difference between the first temperature and the second temperature satisfies a designated condition, the electronic device (e.g., the processor 120 or the power management module 295) may control a charging circuitry function related to charging of the battery at operation 830.

According to an exemplary embodiment, a designated condition may be a condition in which a difference between the first temperature and the second temperature is within a designated range. For example, when a difference between the first temperature and the second temperature is within a designated range, the electronic device may determine that the difference satisfies the designated condition. For example, when a difference between the first temperature and the second temperature is about 5° or more, the electronic device may charge the battery with a specified current.

According to an exemplary embodiment, when a difference between the first temperature and the second temperature satisfies a designated condition, the electronic device may charge the battery with a specified current. For example, when a difference between the first temperature and the second temperature satisfies a designated condition, the electronic device may start charging of the battery with a specified current. In another example, while charging the battery with another specified current, when a difference between the first temperature and the second temperature satisfies a designated condition, the electronic device may change a charging current with a specified current.

According to an exemplary embodiment, when a difference between the first temperature and the second temperature satisfies a designated condition, the electronic device may at least temporarily stop charging of the battery. For example, the electronic device may temporarily stop charging of the battery for a designated time. According to an exemplary embodiment, after a designated time has elapsed, the electronic device may resume charging of the battery. According to an exemplary embodiment, after a designated time is terminated, when another designated condition is satisfied, the electronic device may resume charging of the battery. For example, when a difference between the first temperature and the second temperature is within a designated range, the electronic device may resume charging of the battery.

Figure 9:
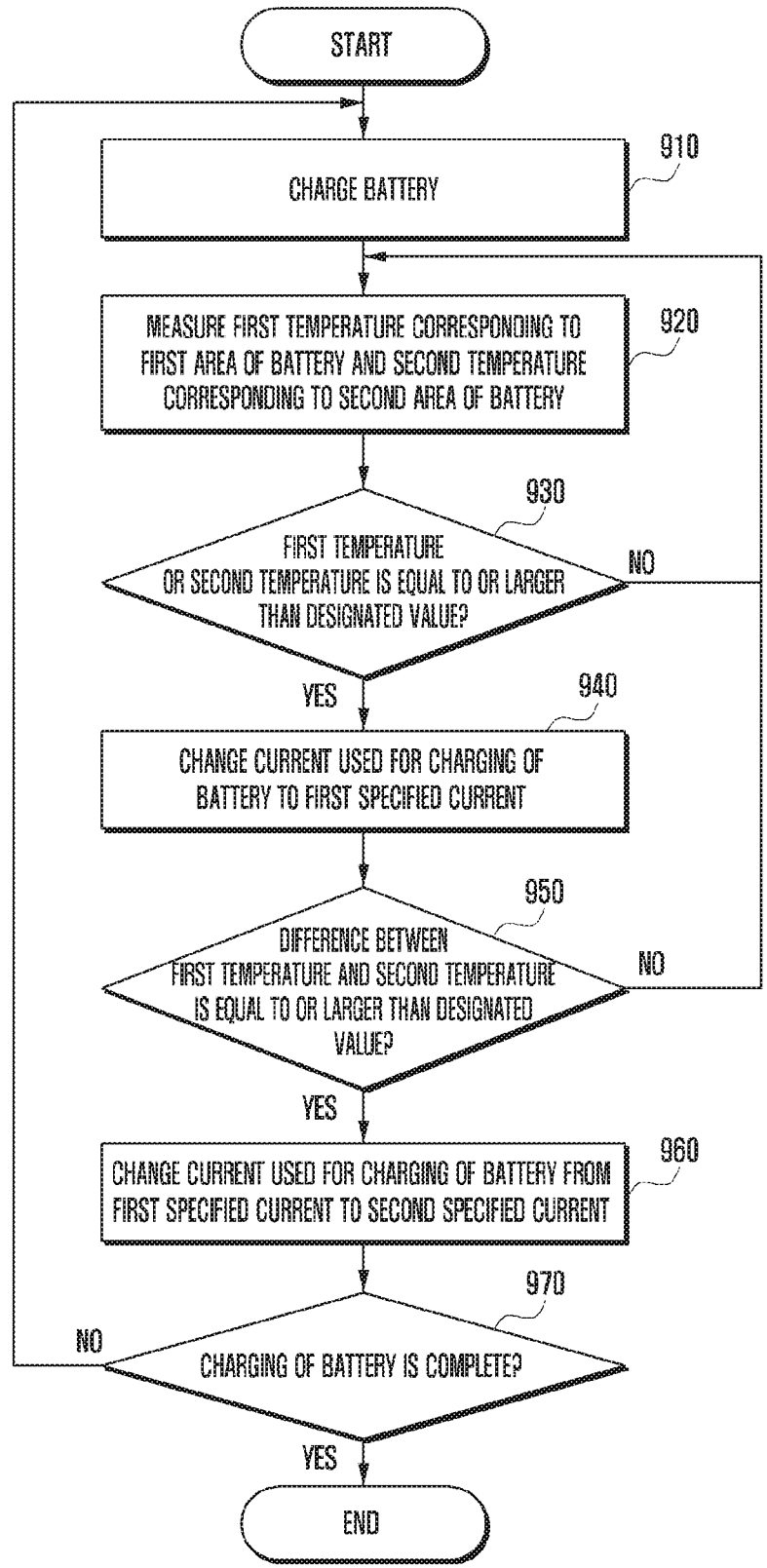
FIG. 9 illustrates a flowchart of a method for controlling the charging of an electronic device, according to various embodiments of the present disclosure.

FIG. 9 illustrates a flowchart of a method for controlling the charging of an electronic device according to various embodiments of the present disclosure.

The electronic device (e.g., the processor 120 or the power management module 295) may charge a battery at operation 910. For example, the electronic device may charge a battery using power received from an external power source.

The electronic device (e.g., the processor 120 or the power management module 295) may measure a first temperature corresponding to a first area of the battery and a second temperature corresponding to a second area of the battery at operation 920. For example, the electronic device may measure a first temperature corresponding to a first area of the battery using a first sensor disposed in proximity of the first area. According to an exemplary embodiment, the first area may be a partial area of the upper end of the battery. For example, the electronic device may measure a first temperature corresponding to a first area of the battery using a second sensor disposed in proximity of the second area. According to an exemplary embodiment, the first area may be a partial area of the low end of the battery.

The electronic device (e.g., the processor 120 or the power management module 295) may determine whether the first temperature or the second temperature is equal to or larger than a designated value at operation 930. For example, the electronic device may determine whether the first temperature or the second temperature is equal to or larger than 45°. According to various exemplary embodiments, a value designated for the first temperature or the second temperature may be the same or different. For example, the electronic device may determine whether the first temperature is equal to or larger than a first designated value or whether the second temperature is equal to or larger than a second designated value.

According to various exemplary embodiments, if a first temperature or a second temperature is equal to or larger than a designated value, the electronic device may perform operation 940. According to various exemplary embodiments, if a first temperature or a second temperature is less than a designated value, the electronic device may continue to measure the first temperature or the second temperature at operation 920. For example, if a first temperature or a second temperature is less than a designated value, the electronic device may continue an executing charging operation.

According to an exemplary embodiment, the electronic device may determine whether a temperature of the battery is equal to or larger than a designated value at operation 930. For example, if a temperature of the battery is less than a designated value, the electronic device may perform operation 910 or 920 and if a temperature of the battery is equal to or larger than a designated value, the electronic device may perform operation 940.

The electronic device (e.g., the processor 120 or the power management module 295) may change a current used for charging of the battery to a first specified current at operation 940. For example, if a first temperature or a second temperature is equal to or larger than a designated value, the electronic device may reduce a current used for charging further than that of a previous case. For example, in order to prevent the battery from being damaged because of heating, the electronic device may charge the battery with a first specified current smaller than a previous charging current.

According to various exemplary embodiments, the electronic device (e.g., the processor 120 or the power management module 295) may control a current used for charging of the battery according to a first temperature, a second temperature, or a temperature of the battery. According to an exemplary embodiment, the electronic device may differently designate a current used for charging of the battery according to a first temperature, a second temperature, or a temperature of the battery and charge the battery using a designated charging current.

According to various exemplary embodiments, the electronic device may designate different charging current values on a plurality of temperature segments basis for a measured temperature (e.g., a first temperature, a second temperature, or a battery temperature). For example, when the first temperature, the second temperature, or the battery temperature is between 0° and 5°, the electronic device may charge the battery with a first current, when the first temperature, the second temperature, or the battery temperature is between 5° and 10°, the electronic device may charge the battery with a second current larger than the first current, and when the first temperature, the second temperature, or the battery temperature is between 10° and 45°, the electronic device may charge the battery with a third current larger than the second current.

The electronic device (e.g., the processor 120 or the power management module 295) may determine whether a difference between the first temperature and the second temperature is equal to or larger than a designated value at operation 950. For example, the electronic device may determine whether a difference between the first temperature and the second temperature is 5° or more. According to various exemplary embodiments, if a difference between the first temperature and the second temperature is equal to or larger than a designated value, the electronic device may perform operation 960. According to various exemplary embodiments, if a difference between the first temperature and the second temperature is less than a designated value, the electronic device may perform operation 910 or 920. For example, if a difference between the first temperature and the second temperature is less than a designated value, the electronic device may continue to measure the first temperature and the second temperature. For example, if a difference between the first temperature and the second temperature is less than a designated value, the electronic device may continue to perform a previously executed charging operation of the battery.

The electronic device (e.g., the processor 120) may change a current used for charging of the battery from a first specified current to a second specified current at operation 960. For example, the second specified current may be smaller than the first specified current. For example, if a difference between the first temperature and the second temperature is equal to or larger than a designated value, in order to reduce temperature and charge unbalance of a first area and a second area of the battery, the electronic device may change a charging current to a second specified current smaller than the first specified current.

The electronic device (e.g., the processor 120) may determine whether charging of the battery is complete at operation 970. According to an exemplary embodiment, if charging of the battery is complete, the electronic device may stop at least temporarily charging. If charging of the battery is not complete, the electronic device may continue to perform a charging operation (e.g., at least one of operations 910 to 960) of the battery.

According to various exemplary embodiments, the electronic device may perform the operations in different order and may omit some operations. For example, the electronic device may measure a first temperature or a second temperature while charging the battery. Further, the electronic device may control a current used for charging of the battery according to only a difference between the first temperature and the second temperature. According to various exemplary embodiments, when the electronic device includes a third sensor that measures a temperature corresponding to a third area (e.g., a third area of the battery) or an area (e.g., an area in which the processor is disposed) in which another constituent element exists within the electronic device, operation 920 may be performed based on a third temperature measured through a third sensor instead of the first temperature or the second temperature.

In a method of controlling charging of an electronic device according to various exemplary embodiments of the present invention, by solving temperature unbalance and charge unbalance on an area basis of a battery that may occur upon charging the battery by changing a charging current according to a temperature difference between a first area and a second area in the battery, the battery can be prevented from being damaged and stability of the battery can be improved.

A term "module" used in the present disclosure may be a unit including a combination of at least one of, for example, hardware, software, or firmware. The "module" may be interchangeably used with a term such as a unit, logic, a logical block, a component, or a circuit. The "module" may be a minimum unit or a portion of an integrally formed component. The "module" may be a minimum unit or a portion that performs at least one function. The "module" may be mechanically or electronically implemented. For example, a "module" according to an exemplary embodiment of the present disclosure may include at least one of an Application-Specific Integrated Circuit (ASIC) chip, Field-Programmable Gate Arrays (FPGAs), or a programmable-logic device that performs any operation known or to be developed.

According to various exemplary embodiments, at least a portion of a method (e.g., operations) or a device (e.g., modules or functions thereof) according to the present disclosure may be implemented with an instruction stored at computer-readable storage media in a form of, for example, a programming module. When the instruction is executed by at least one processor (e.g., the processor 120), the at least one processor may perform a function corresponding to the instruction. The computer-readable storage media may be, for example, the memory 130. At least a portion of the programming module may be implemented (e.g., executed) by, for example, the processor 120. At least a portion of the programming module may include, for example, a module, a program, a routine, sets of instructions, or a process that performs at least one function.

The computer-readable storage media may include magnetic media such as a hard disk, floppy disk, and magnetic tape, optical media such as a Compact Disc Read Only memory (CD-ROM) and a Digital Versatile Disc (DVD), magneto-optical media such as a floptical disk, and a hardware device, specially formed to store and perform a program instruction (e.g., a programming module), such as a Read Only memory (ROM), a Random Access memory (RAM), a flash memory. Further, a program instruction may include a high-level language code that may be executed by a computer using an interpreter as well as a machine language code generated by a compiler. In order to perform operation of the present disclosure, the above-described hardware device may be formed to operate as at least one software module, and vice versa.

A module or a programming module according to the present disclosure may include at least one of the foregoing constituent elements, may omit some constituent elements, or may further include additional other constituent elements. Operations performed by a module, a programming module, or another constituent element according to the present disclosure may be executed with a sequential, parallel, repeated, or heuristic method. Further, some operations may be executed in different orders, may be omitted, or may add other operations.

According to various exemplary embodiments, in a storage medium that stores instructions, when the instructions are executed by at least one processor, the instructions are set to enable the at least one processor to perform at least one operation, wherein the at least one operation may include operation of acquiring, by a first electronic device, address information of a second electronic device and location information of at least one application to be executed by interlocking with at least the second electronic device through first short range communication with the outside; operation of connecting, by the first electronic device, second distance communication with the second electronic device based on the address information; operation of receiving, by the first electronic device, the application from the outside based on the location information; and operation of executing, by the first electronic device, the application by interlocking with the second electronic device through the second distance communication.

According to an electronic device and a method of controlling charging of the same according to various exemplary embodiments of the present invention, a charging operation of the electronic device can be controlled according to a temperature of a battery.

According to an electronic device and a method of controlling charging of the same according to various exemplary embodiments of the present invention, a charging operation of a battery can be controlled in consideration of a parameter (e.g., a temperature, pressure, thickness, charge amount) on an area basis of the battery or a difference between parameters on an area basis of the battery.

According to an electronic device and a method of controlling charging of the same according to various exemplary embodiments of the present invention, unbalance (e.g., unbalance of a charge amount, energy, a temperature, a thickness, a pressure) on an area basis of a battery that may occur upon charging the battery can be reduced.

According to an electronic device and a method of controlling charging of the same according to various exemplary embodiments of the present invention, by controlling charging of a battery in consideration of a state on an area basis of the battery, the battery can be prevented from being damaged and charge efficiency of the battery can be enhanced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device, comprising:
a circuit board;
a battery;
a charging circuitry for charging the battery;
a first sensor positioned in a first area of the battery and configured to measure a first temperature corresponding to the first area of the battery;
a second sensor positioned in a second area of the battery and configured to measure a second temperature corresponding to the second area of the battery; and
a processor coupled to the circuit board, the battery, the charging circuitry, the first sensor, and the second sensor,
wherein the processor is configured to:
acquire the first temperature measured using the first sensor and the second temperature measured using the second sensor, and
lower a charging current of the battery to a non-zero value using the charging circuitry based on a difference between the first temperature and the second temperature satisfying a designated condition, wherein the designated condition is the difference being larger than a designated value.

2. The electronic device of claim 1, wherein the processor is further configured to acquire the first temperature and the second temperature, while the charging current of the battery is a second non-zero value.

3. The electronic device of claim 2, wherein the processor is further configured to change the charging current of the battery from the second non-zero value to the non-zero value.

4. The electronic device of claim 2, wherein the processor is further configured to refrain from changing the charging current of the battery from the second non-zero value to the non-zero value based on a difference between the first temperature and the second temperature not satisfying the designated condition.

5. The electronic device of claim 1, further comprising a third sensor for measuring a third temperature corresponding to at least one element connected to the circuit board,
wherein the processor is further configured to:
acquire the third temperature measured using the third sensor, and
charge the battery based on the third temperature satisfying a second designated condition.

6. An electronic device, comprising:
a circuit board;
a battery;
a charging circuitry for charging the battery;
at least one sensor positioned in the battery and configured to measure a first temperature corresponding to a first area of the battery and a second temperature corresponding to a second area of the battery; and
a processor coupled to the circuit board, the battery, the charging circuitry, and the at least one sensor,
wherein the processor is configured to:
acquire the first temperature and the second temperature measured using the at least one sensor, and
lower a charging current of the battery to a non-zero value using the charging circuitry based on a difference between the first temperature and the second temperature satisfying a designated condition, wherein the designated condition is the difference being larger than a designated value.

7. The electronic device of claim 6, wherein the processor is further configured to acquire the first temperature and the second temperature, while the charging current of the battery is a second non-zero value.

8. The electronic device of claim 7, wherein the processor is further configured to change the charging current of the battery from the second non-zero value to the non-zero value.

9. The electronic device of claim 6, wherein the processor is further configured to determine that a difference between the first temperature and the second temperature satisfies the designated condition, based on the difference being within a designated range.

10. The electronic device of claim 6, further comprising a third sensor for measuring a third temperature corresponding to at least one element connected to the circuit board,
wherein the processor is further configured to:
acquire the third temperature measured using the third sensor, and
charge the battery based on the third temperature satisfying a second designated condition.

11. An electronic device, comprising:
a circuit board;
a battery;
a charging circuitry for charging the battery;
at least one sensor positioned in the battery and configured to measure a first temperature corresponding to a first area of the battery and a second temperature corresponding to a second area of the battery; and
a processor coupled to the circuit board, the battery, the charging circuitry, and the at least one sensor,
wherein the processor is configured to:
acquire the first temperature and the second temperature measured using the at least one sensor, and
control a function of the charging circuitry related to charging of the battery to lower a charging current of the battery to a non-zero value based on a difference between the first temperature and the second temperature satisfying a designated condition, wherein the designated condition is the difference being larger than a designated value.

12. The electronic device of claim 11, wherein the processor is further configured to acquire the first temperature and the second temperature while the charging current of the battery is a second non-zero value.

13. The electronic device of claim 12, wherein the processor is further configured to change the charging current of the battery from the second non-zero value to the non-zero value.

14. The electronic device of claim 12, wherein the processor is further configured to stop at least temporarily the charging of the battery.

15. The electronic device of claim 14, wherein the processor is further configured to resume the charging the battery after a designated time is terminated.

16. The electronic device of claim 15, wherein the processor is further configured to resume the charging of the battery, based on the difference satisfying another designated condition after the designated time is terminated.

17. The electronic device of claim 11, wherein the processor is further configured to acquire the first temperature and the second temperature, while the battery is not charged, and start charging of the battery.

18. The electronic device of claim 11, wherein the at least one sensor comprises a first sensor for measuring the first temperature and a second sensor for measuring the second temperature.

19. The electronic device of claim 18, wherein the first sensor is disposed in the first area of the battery, and the second sensor is disposed in the second area of the battery.

20. The electronic device of claim 11, wherein the first area of the battery is a partial area of an upper end of the battery, and the second area of the battery is a partial area of a low end of a direction opposite to that of the first area of the battery.

* * * * *